United States Patent
Chen et al.

(10) Patent No.: US 9,336,014 B2
(45) Date of Patent: May 10, 2016

(54) METHOD, APPARATUS, AND SYSTEM FOR HUMAN-MACHINE INTERACTION

(71) Applicant: Tencent Technology (Shenzhen) Company Limited, Shenzhen (CN)

(72) Inventors: Jingcong Chen, Shenzhen (CN); Bin Li, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 0 days.

(21) Appl. No.: 14/744,363

(22) Filed: Jun. 19, 2015

(65) Prior Publication Data

US 2015/0286485 A1 Oct. 8, 2015

Related U.S. Application Data

(63) Continuation of application No. PCT/CN2013/089729, filed on Dec. 17, 2013.

(51) Int. Cl.
*G06F 9/44* (2006.01)
*G06F 9/445* (2006.01)
*G06F 15/02* (2006.01)

(52) U.S. Cl.
CPC .......... *G06F 9/4426* (2013.01); *G06F 9/44505* (2013.01); *G06F 9/44542* (2013.01); *G06F 15/0225* (2013.01)

(58) Field of Classification Search
CPC .............. G06F 9/4426; G06F 9/44542; G06F 9/44505; G06F 15/0225
See application file for complete search history.

(56) References Cited

U.S. PATENT DOCUMENTS

| 6,085,098 A * | 7/2000 | Moon | G06F 1/1615 455/456.1 |
| 6,757,530 B2 * | 6/2004 | Rouse | H04M 3/493 455/412.1 |

(Continued)

FOREIGN PATENT DOCUMENTS

| CN | 102355667 A | 2/2012 |
| CN | 102622281 A | 8/2012 |

OTHER PUBLICATIONS

Tencent Tech, ISR, PCT/CN2013/089729, Mar. 20, 2014, 2 pgs.

(Continued)

*Primary Examiner* — M Elamin
(74) *Attorney, Agent, or Firm* — Morgan, Lewis & Bockius LLP

(57) ABSTRACT

The present disclosure provides a method for configuring a basic application function of an intelligent terminal. The method includes: replacing, in a system program, an original initialization subprogram of an application class in the system program with a new initialization subprogram; configuring an invocation pointer to the original initialization subprogram in the new initialization subprogram, the invocation pointer being used for invoking and executing the original initialization subprogram when the new initialization subprogram is executed; registering a global notification in the new initialization subprogram, the global notification being used for monitoring a trigger condition that is generated by a third-party application program with respect to the application class; and configuring an invocation pointer to the application class in a callback handler function of the global notification, the invocation pointer being used for invoking and executing the application class by using the callback handler function when the trigger condition is detected.

8 Claims, 4 Drawing Sheets

(56) References Cited

U.S. PATENT DOCUMENTS

| | | | |
|---|---|---|---|
| 8,706,104 B1 * | 4/2014 | Ralston | H04L 12/6418 370/328 |
| 9,077,657 B1 * | 7/2015 | Ralston | H04L 12/6418 |
| 9,122,557 B1 * | 9/2015 | Swerdlow | G06F 8/65 |
| 2004/0158553 A1 * | 8/2004 | Keller | G06F 9/44542 |

OTHER PUBLICATIONS

Tencent Tech, WO, PCT/CN2013/089729, Mar. 20, 2014, 7 pgs.

* cited by examiner

METHOD, APPARATUS, AND SYSTEM FOR HUMAN-MACHINE INTERACTION

RELATED APPLICATIONS

This application is a continuation application of PCT Patent Application No. PCT/CN2013/089729, entitled "MAN-MACHINE INTERACTION METHOD, AND RELEVANT DEVICE AND SYSTEM" filed on Dec. 17, 2013, which claims priority to Chinese Patent Application No. 201210555133.6, filed with the State Intellectual Property Office of the People's Republic of China on Dec. 20, 2012, and entitled "METHOD FOR CONFIGURING BASIC APPLICATION FUNCTION OF INTELLIGENT TERMINAL, AND IMPLEMENTING METHOD AND APPARATUS", both of which are incorporated herein by reference in their entirety.

FIELD OF THE TECHNOLOGY

The present disclosure relates to data processing technologies of intelligent terminals, and in particular, to a method for configuring a basic application function of an intelligent terminal, and associated apparatus.

BACKGROUND OF THE DISCLOSURE

Currently, intelligent terminals are a main form of mobile terminals. Similar to ordinary computers, the intelligent terminals are all equipped with an operating system (OS), and can dispatch hardware and software resources in the intelligent terminals so as to implement various functions. Different developers provide different operating systems. For example, iOS developed and applied by Apple Inc. is a typical operating system of intelligent terminals.

In addition to the operating system, existing intelligent terminals are often equipped with basic application programs, so as to provide some basic functions. The basic application programs and the operating system can be called system programs of the intelligent terminals. For example, a phone call function is one of the basic application functions implemented by the basic application programs. Still using iOS as an example, a phone application is configured in a system program to implement the phone call function of an intelligent terminal. Specifically, iOS invokes the phone application by means of a universal resource locator (URL), to implement a phone call operation initiated by a user.

However, the URL manner has strict requirements for phone numbers that are input, for example, some special numbers such as a short number cannot be correctly identified in the URL manner to trigger the phone call. However, configuration of the system program can invoke the phone call only by using a URL to trigger the phone call, which obviously restricts the flexibility of the phone call on an intelligent terminal. Certainly, the problem related to the phone call function also exists in other similar basic application functions.

SUMMARY

In the existing technology, configuration of a system program of an intelligent terminal can invoke a phone call only by using a URL to trigger the phone call, which obviously restricts the flexibility of the phone call on the intelligent terminal.

In view of this, according to one aspect of the present disclosure, a method for configuring a basic application function of an intelligent terminal, an implementation method and apparatus are provided, so as to improve the flexibility of the basic application function in the intelligent terminal.

The method for configuring a basic application function of an intelligent terminal includes:
at the intelligent terminal having one or more processors and memory storing program modules to be executed by the one or more processors:
replacing, in a system program, an original initialization subprogram of an application class in the system program with a new initialization subprogram;
configuring an invocation pointer to the original initialization subprogram in the new initialization subprogram, the invocation pointer being used for invoking and executing the original initialization subprogram when the new initialization subprogram is executed;
registering a global notification in the new initialization subprogram, the global notification being used for monitoring a trigger condition that is generated by a third-party application program with respect to the application class; and
configuring an invocation pointer to the application class in a callback handler function of the global notification, the invocation pointer being used for invoking and executing the application class by using the callback handler function when the trigger condition is detected.

Correspondingly, according to another aspect of the present disclosure, an intelligent terminal includes one or more processors, memory, and a plurality of program modules stored in the memory and to be executed by the one or more processors, the plurality of program modules further including:
an initialization replacement module, configured to replace, in a system program, an original initialization subprogram of an application class in the system program with a new initialization subprogram;
a first pointer configuration module, configured to configure an invocation pointer to the original initialization subprogram in the new initialization subprogram, so as to invoke and execute the original initialization subprogram when the new initialization subprogram is executed;
a notification registration module, configured to register a global notification in the new initialization subprogram, the global notification being used for monitoring a trigger condition that is generated by a third-party application program with respect to the application class; and
a second pointer configuration module, configured to configure an invocation pointer to the application class in a callback handler function of the global notification, so as to invoke and execute the application class by using the callback handler function when the trigger condition is detected.

Correspondingly, according to another aspect of the present disclosure, a method for implementing a third-party application program of an intelligent terminal is further provided, including:
at the intelligent terminal having one or more processors and memory storing program modules to be executed by the one or more processors:
executing the third-party application program, and generating a trigger condition;
triggering and executing a new initialization subprogram and a corresponding callback handler function when the trigger condition is detected by using a global notification of the new initialization subprogram of an application class in a system program;

triggering and executing the application class by using an invocation pointer in the callback handler function; and triggering and executing an original initialization subprogram of the application class by using an invocation pointer in the new initialization subprogram.

Correspondingly, according to yet another aspect of the present disclosure, an intelligent terminal includes one or more processors, memory, and a plurality of program modules stored in the memory and to be executed by the one or more processors, the plurality of program modules further including:

a third-party executing module, configured to execute the third-party application program and generate a trigger condition;

a monitoring and triggering module, configured to trigger and execute a new initialization subprogram and a corresponding callback handler function when the trigger condition is detected by using a global notification of the new initialization subprogram of an application class in a system program;

an application class triggering module, configured to trigger and execute the application class by using an invocation pointer in the callback handler function; and an original initialization module, configured to trigger and execute an original initialization subprogram of the application class by using an invocation pointer in the new initialization subprogram.

It can be learned from the above technical solutions that, in the aforementioned aspects of the present disclosure, through replacement of an initialization subprogram, an application class of a system program can be invoked by a third-party application program, so as to implement a basic application function. In addition, the flexibility in development of third-party application programs greatly enriches basic application functions.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

The following describes in detail embodiments of the present disclosure with reference to the accompanying drawings in the embodiments of the present disclosure. Apparently, the described embodiments are merely some of the embodiments of the present disclosure rather than all of the embodiments. All other embodiments obtained by a person of ordinary skill in the art based on the embodiments of the present disclosure without creative efforts, shall fall within the protection scope of the present disclosure.

Embodiment 1

Figure 1:
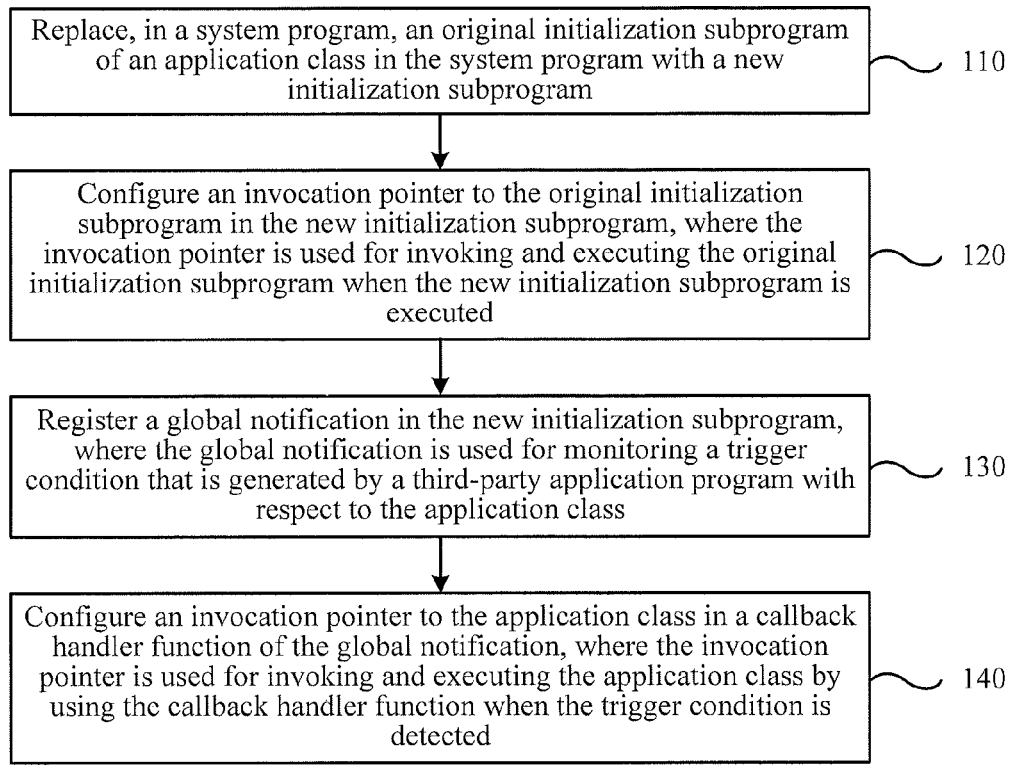
FIG. 1 is a flowchart of a method for configuring a basic application function of an intelligent terminal according to Embodiment 1 of the present disclosure.

FIG. 1 is a flowchart of a method for configuring a basic application function of an intelligent terminal according to Embodiment 1 of the present disclosure. The method may apply to configuration of a basic application function set in a system program of an intelligent terminal, so that a third-party application program can be installed in the intelligent terminal, and executed in cooperation with a basic application program, thereby enriching basic application functions and improving operation flexibility. The configuration method in this embodiment of the present disclosure may be implemented in the form of software, and is run by the intelligent terminal to implement configuration of the intelligent terminal. In an embodiment of the present disclosure, the intelligent terminal includes but is not limited to a terminal device such as a notebook computer, a tablet computer, a smart phone, or a personal digital assistant (PDA).

Specifically, the configuration method in this embodiment of the present disclosure includes at least the following steps starting from step 110.

Step 110: Replace, in a system program, an original initialization subprogram of an application class in the system program with a new initialization subprogram.

In step 110 of this embodiment of the present disclosure, an operation of replacing the original initialization subprogram with the new initialization subprogram may be specifically as follows: in the system program, using a Hook technology to replace an invocation pointer to the original initialization subprogram of the application class in the system program with an invocation pointer to the new initialization subprogram in a dynamic library. According to the solution, the new initialization subprogram may be stored in the form of a dynamic library, so as to facilitate extension and update of subprograms in the dynamic library. The Hook technology is specifically a method of loading a dynamic library into a program, and replacing an original system function with a customized function.

Step 120: Configure an invocation pointer to the original initialization subprogram in the new initialization subprogram, where the invocation pointer is used for invoking and executing the original initialization subprogram when the new initialization subprogram is executed.

Step 130: Register a global notification in the new initialization subprogram, where the global notification is used for monitoring a trigger condition that is generated by a third-party application program with respect to the application class.

Step 140: Configure an invocation pointer to the application class in a callback handler function of the global notification, where the invocation pointer is used for invoking and executing the application class by using the callback handler function when the trigger condition is detected.

In this embodiment of the present disclosure, the configuration method can be used to configure various basic application functions of an intelligent terminal. Phone call, which is a basic application function, is used as an example below for description. Correspondingly, the application class is a PhoneApplication class, the third-party application program is a phone call program, and the trigger condition is a phone call request generated by the phone call program. In this embodiment of the present disclosure, the third-party application program may be an application that is developed by any third party and can trigger a phone call after a phone number is input.

Figure 2:
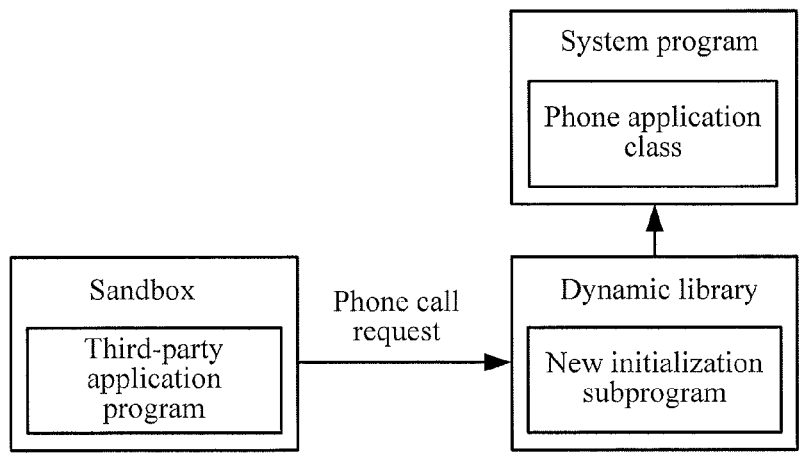
FIG. 2 is a schematic architectural diagram of an applicable software functional module according to Embodiment 1 of the present disclosure.

The configuration method in this embodiment of the present disclosure may be implemented in the form of software. The frame structure of software functional modules thereof is shown in FIG. 2. The intelligent terminal is equipped with a system program, where the system program includes but is not limited to a basic application class, for example, a phone application class. A dynamic library is loaded in the intelligent terminal, where the dynamic library stores at least a new initialization subprogram corresponding to the phone application class. The dynamic library is a public library for running software, and as a basic dependent package for running of an application program, may have various plug-ins or programs stored therein, and may be used to dynamically replace code, data, or the like in a memory. A third-party application program is further installed in the intelligent terminal, so as to implement the basic application function in cooperation. The third-party application program generally uses a sandbox technology, so as to ensure that the third-party application program can only access content under its own directory.

The above descriptions give details of a method for configuring a basic application function of an intelligent terminal according to an embodiment of the present disclosure.

Figure 3:
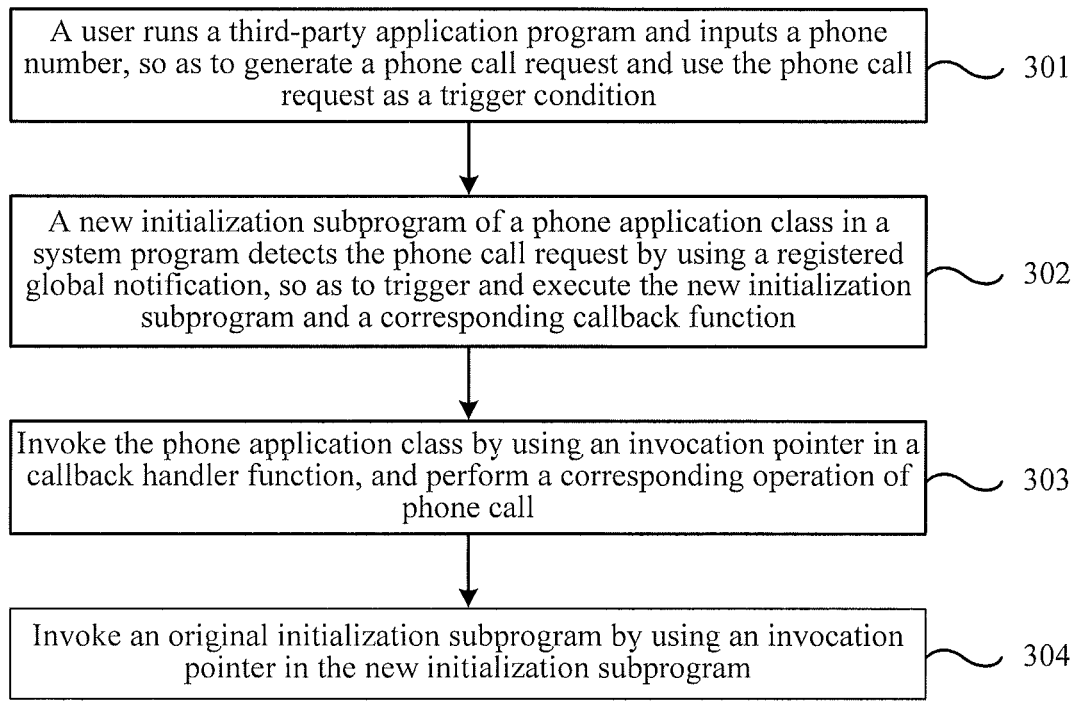
FIG. 3 is a flowchart of a phone call procedure executed by an intelligent terminal configured according to Embodiment 1 of the present disclosure.

After a system program of an intelligent terminal is configured according to the configuration method of this embodiment of the present disclosure, a flowchart of a phone call procedure executed by an intelligent terminal configured according to Embodiment 1 of the present disclosure is shown in FIG. 3. The phone call procedure includes at least the following steps starting from step 301.

Step 301: A user runs a third-party application program and inputs a phone number, so as to generate a phone call request and use the phone call request as a trigger condition.

Step 302: A new initialization subprogram of a phone application class in a system program detects the phone call request by using a registered global notification, so as to trigger and execute the new initialization subprogram and a corresponding callback function.

Step 303: Invoke the phone application class by using an invocation pointer in a callback handler function, and perform a corresponding operation of phone call.

Step 304: Invoke an original initialization subprogram by using an invocation pointer in the new initialization subprogram, so that the system program completes another initialization operation with respect to a phone call function without affecting the original initialization program.

The above procedure utilizes a phone application class of the system program to implement the phone call function. In addition, the flexibility in development of third-party application programs greatly enriches the phone call function. For example, the aforementioned method can be utilized to identify various short numbers, special symbols and the like, and is not limited to invoking a phone application class by using a URL to trigger the phone application class. For example, an additional function may also be configured, such as inquiry of an international mobile equipment identity (IMEI) by using *#06#. In addition, the third-party application program, compared with the manner of invoking the phone application class by using a URL, can accelerate initiation of the phone application class.

The technical solution in this embodiment of the present disclosure applies to configuration of a system program of an intelligent terminal, so that a basic application function may be implemented by using a third-party application program. For example, the solution is typically applicable to configuration of an iOS platform.

The above descriptions give details of a method for configuring a basic application function of an intelligent terminal according to an embodiment of the present disclosure, and a phone call procedure executed by an intelligent terminal configured according to the method.

According to another embodiment of the present disclosure, an apparatus for configuring a basic application function of an intelligent terminal is further provided.

Embodiment 2

Figure 4:
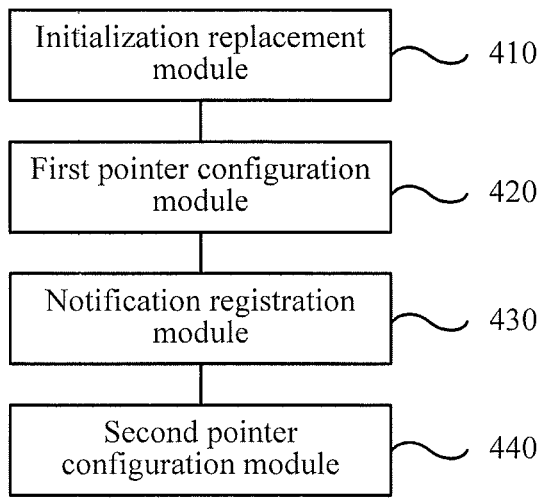
FIG. 4 is a schematic structural diagram of an apparatus for configuring a basic application function of an intelligent terminal according to Embodiment 2 of the present disclosure.

FIG. 4 is a schematic structural diagram of an apparatus for configuring a basic application function of an intelligent terminal according to Embodiment 2 of the present disclosure. The configuration apparatus includes an initialization replacement module 410, a first pointer configuration module 420, a notification registration module 430, and a second pointer configuration module 440. In this embodiment of the present disclosure, the initialization replacement module 410 is configured to replace, in a system program, an original initialization subprogram of an application class in the system program with a new initialization subprogram. The first pointer configuration module 420 is configured to configure an invocation pointer to the original initialization subprogram in the new initialization subprogram, so as to invoke and execute the original initialization subprogram when the new initialization subprogram is executed. The notification registration module 430 is configured to register a global notification in the new initialization subprogram, where the global notification is used for monitoring a trigger condition that is generated by a third-party application program with respect to the application class. The second pointer configuration module 440 is configured to configure an invocation pointer to the application class in a callback handler function of the global notification, so as to invoke and execute the application class by using the callback handler function when the trigger condition is detected.

In this embodiment of the present disclosure, the initialization replacement module 410 may further be configured to use a Hook technology in the system program to replace an invocation pointer to the original initialization subprogram of the application class in the system program with an invocation pointer to the new initialization subprogram in a dynamic library.

In an embodiment of the present disclosure, the intelligent terminal includes but is not limited to a terminal device such as a notebook computer, a tablet computer, a smart phone, or a PDA.

According to an embodiment of the present disclosure, the method for configuring a basic application function of an intelligent terminal shown in FIG. 1 may be a human-computer interaction method executed by units in the apparatus for configuring a basic application function of an intelligent terminal shown in FIG. 4. For example, step 110 shown in FIG. 1 may be performed by the initialization replacement module 410 shown in FIG. 4. Step 120 shown in FIG. 1 may be performed by the first pointer configuration module 420 shown in FIG. 4. Step 130 shown in FIG. 1 may be performed by the notification registration module 430 shown in FIG. 4. Step 140 shown in FIG. 1 may be performed by the second pointer configuration module 440 shown in FIG. 4.

According to another embodiment of the present disclosure, some or all of the units in the apparatus for configuring a basic application function shown in FIG. 4 may be integrated into one or more other units, or one or more of the units may be further divided into multiple smaller functional units, which may implement the same operation without affecting the implementation of technical effects of this embodiment of the present disclosure. The above units are divided on the basis of logical functions. In practical application, a function of one unit may also be implemented by multiple units, or functions of multiple units may be implemented by one unit. In other embodiments of the present disclosure, the terminal device may also include other modules. However, in practical application, these functions may also be implemented with the assistance of other units, and may be implemented by multiple units in cooperation.

According to another embodiment of the present disclosure, a computer program (including program code) that can execute the method for configuring a basic application function of an intelligent terminal shown in FIG. 1 may be run on a general computing device, such as a computer, that includes processing elements and storage elements such as a central processing unit (CPU), a random access memory (RAM), and a read-only memory (ROM), to form the apparatus for configuring a basic application function shown in FIG. 4 and implement the method for configuring a basic application function according to the embodiment of the present disclosure. The computer program may be recorded, for example, on a computer-readable recording medium, loaded into the computing device through the computer-readable recording medium, and run in the computing device.

In this embodiment of the present disclosure, the application class is a phone application class, the third-party application program is a phone call program, and the trigger condition is a phone call request generated by the phone call program.

The apparatus for configuring a basic application function of an intelligent terminal provided by this embodiment of the present disclosure can execute the method for configuring a basic application function of an intelligent terminal provided by any embodiment of the present disclosure, and has corresponding functional modules, so that a third-party application program can invoke a basic application program, thereby enriching basic application functions of the intelligent terminal.

The above descriptions give details of an apparatus for configuring a basic application function of an intelligent terminal according to an embodiment of the present disclosure.

According to another embodiment of the present disclosure, a method for implementing a third-party application program of an intelligent terminal is further provided.

Embodiment 3

Figure 5:
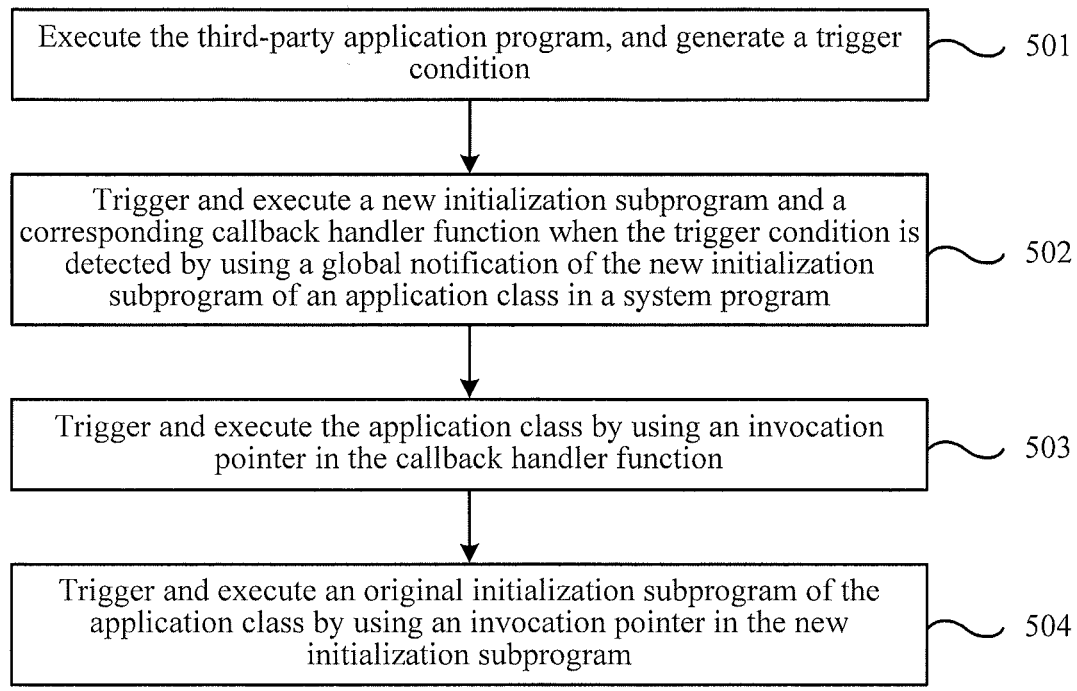
FIG. 5 is a flowchart of a method for implementing a third-party application program of an intelligent terminal according to Embodiment 3 of the present disclosure.

FIG. 5 is a flowchart of a method for implementing a third-party application program of an intelligent terminal according to Embodiment 3 of the present disclosure. After being configured according to a configuration method provided by an embodiment of the present disclosure, the intelligent terminal can implement the third-party application program according to the following process. The method specifically includes the following steps starting from step 501.

Step 501: Execute the third-party application program, and generate a trigger condition.

Step 502: Trigger and execute a new initialization subprogram and a corresponding callback handler function when the trigger condition is detected by using a global notification of the new initialization subprogram of an application class in a system program.

Step 503: Trigger and execute the application class by using an invocation pointer in the callback handler function.

Step 504: Trigger and execute an original initialization subprogram of the application class by using an invocation pointer in the new initialization subprogram.

The application class may be a phone application class, the third-party application program is a phone call program, and the trigger condition is a phone call request generated by the phone call program. The specific process is described above. In an embodiment of the present disclosure, the intelligent terminal includes but is not limited to a terminal device such as a notebook computer, a tablet computer, a smart phone, or a PDA.

The above descriptions give details of a method for implementing a third-party application program of an intelligent terminal according to an embodiment of the present disclosure.

According to another embodiment of the present disclosure, an apparatus for implementing a third-party application program of an intelligent terminal is further provided.

Embodiment 4

Figure 6:
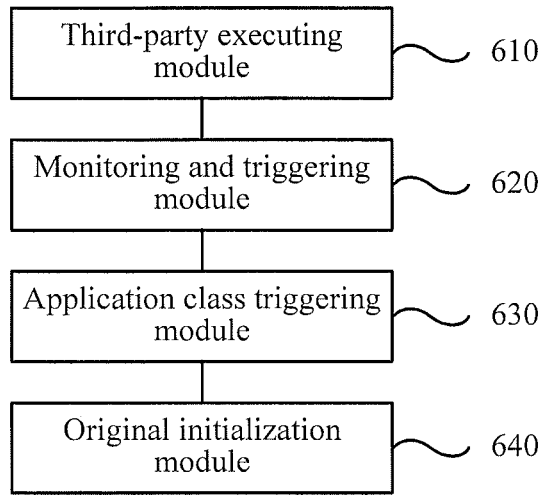
FIG. 6 is a schematic structural diagram of an apparatus for implementing a third-party application program of an intelligent terminal according to Embodiment 4 of the present disclosure.

FIG. 6 is a schematic structural diagram of an apparatus for implementing a third-party application program of an intelligent terminal according to Embodiment 4 of the present disclosure. The apparatus includes a third-party executing module 610, a monitoring and triggering module 620, an application class triggering module 630 and an original initialization module 640. In this embodiment of the present disclosure, the third-party executing module 610 executes the third-party application program and generates a trigger condition. The monitoring and triggering module 620 triggers and executes a new initialization subprogram and a corresponding callback handler function when the trigger condition is detected by using a global notification of the new initialization subprogram of an application class in a system program. The application class triggering module 630 triggers and executes the application class by using an invocation pointer in the callback handler function. The original initialization module 640 triggers and executes an original initialization subprogram of the application class by using an invocation pointer in the new initialization subprogram.

In an embodiment of the present disclosure, the intelligent terminal includes but is not limited to a terminal device such as a notebook computer, a tablet computer, a smart phone, or a PDA.

According to an embodiment of the present disclosure, the method for implementing a third-party application program of an intelligent terminal shown in FIG. 5 may be a human-computer interaction method executed by units in the apparatus for implementing a third-party application program of an intelligent terminal shown in FIG. 6. For example, step 501 shown in FIG. 5 may be performed by the third-party executing module 610 shown in FIG. 6. Step 502 shown in FIG. 5 may be performed by the monitoring and triggering module 620 shown in FIG. 6. Step 503 shown in FIG. 5 may be performed by the application class triggering module 630 shown in FIG. 6. Step 504 shown in FIG. 5 may be performed by an original initialization module 640 shown in FIG. 6.

According to another embodiment of the present disclosure, some or all of the units in the apparatus for implementing a third-party application program shown in FIG. 6 may be integrated into one or more other units, or one or more of the units may be further divided into multiple smaller functional units, which may implement the same operation without affecting the implementation of technical effects of this embodiment of the present disclosure. The above units are divided on the basis of logical functions. In practical application, a function of one unit may also be implemented by multiple units, or functions of multiple units may be implemented by one unit. In other embodiments of the present disclosure, the terminal device may also include other modules. However, in practical application, these functions may also be implemented with the assistance of other units, or implemented by multiple units in cooperation.

According to another embodiment of the present disclosure, a computer program (including program code) that can execute the method for implementing a third-party application program shown in FIG. 1 may be run on a general computing device, such as a computer, that includes processing elements and storage elements such as a CPU, a RAM, and a ROM, to form the apparatus for implementing a third-party application program shown in FIG. 6, and implement the method for implementing a third-party application program according to the embodiment of the present disclosure. The computer program may be recorded, for example, on a computer-readable recording medium, loaded into the computing device through the computer-readable recording medium, and run in the computing device.

The apparatus may be configured to execute the method for implementing a third-party application program of an intelligent terminal provided by any embodiment of the present disclosure, and has corresponding functional modules and beneficial effects. In an embodiment of the present disclosure, the intelligent terminal includes but is not limited to a terminal device such as a notebook computer, a tablet computer, a smart phone, or a PDA.

Embodiment 5

Figure 7:
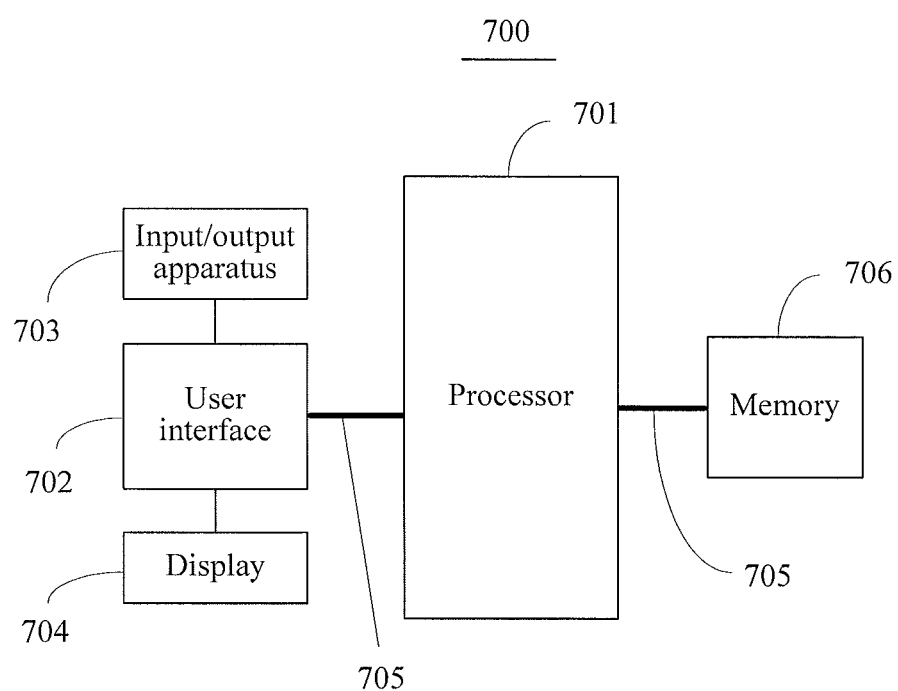
FIG. 7 is a schematic structural diagram of a terminal device according to an embodiment of the present disclosure.

Referring to FIG. 7, FIG. 7 is a schematic structural diagram of a terminal device according to an embodiment of the present disclosure. A terminal device 700 shown in FIG. 7 may be but is not limited to an intelligent terminal such as a smart phone (for example, an Android phone, or an iOS phone), a tablet computer, a palmtop computer, a mobile Internet device (MID), or a PAD. As shown in FIG. 7, the terminal device 700 may include but is not limited to: a processor 701, a user interface 702, an input/output apparatus 703 and a display 704 that are connected to the processor 701 through the user interface 702, a bus 705, and a memory 706 connected to the processor 701 through the bus 705.

The input/output apparatus 703 is configured to input information to or output information from the terminal device 700, for example, inputting a phone number, or making a call. Specifically, the input/output apparatus 703 may include a keyboard, a mouse, a touch panel and the like.

The display 704 is configured to display the content or information output or generated by the terminal device 700, such as a phone number input by the input/output apparatus 703, a virtual function key, and a virtual menu, for a user to trigger a corresponding function.

The memory 706 is configured to store an application program, such as a basic application program and a third-party application program. Specifically, the memory 706 may include: a memory module (such as a ROM and a RAM), a flash memory module, a mass memory (such as a CD-ROM, a USB flash disk, and a mobile hard disk), and the like.

The memory 706 has stored therein a system program configured in the terminal device 700, where the system program includes but is not limited to a basic application program, such as a phone application class. A dynamic library is loaded in the memory 706, where the dynamic library stores at least a new initialization subprogram corresponding to the phone application class. The dynamic library is a public library for running software, and as a basic dependent package for running of an application program, may have various plug-ins or programs stored therein, and may be used to dynamically replace code, data, or the like in a memory. A third-party application program is also installed in the memory 706, so as to implement a basic application function in cooperation. For example, the third-party application program is a phone call program, and the trigger condition is a phone call request generated by the phone call program.

The processor 701 may include any suitable processor, and may further include a multi-core processor implementing multithread processing or parallel processing, and is configured to invoke, through the bus 705, the system program stored in the memory 706. When the terminal device 700 runs the configuration of the basic application function, the processor 701 executes the following operations:

replacing, in a system program, an original initialization subprogram of an application class in the system program with a new initialization subprogram;

configuring an invocation pointer to the original initialization subprogram in the new initialization subprogram, the invocation pointer being used for invoking and executing the original initialization subprogram when the new initialization subprogram is executed;

registering a global notification in the new initialization subprogram, the global notification being used for monitoring a trigger condition that is generated by a third-party application program with respect to the application class; and configuring an invocation pointer to the application class in a callback handler function of the global notification, the invocation pointer being used for invoking and executing the application class by using the callback handler function when the trigger condition is detected.

After the configuration of the system program is completed in the terminal device 700, a phone number is input through the input/output apparatus 703, and is displayed on the display 704. Then the processor 701 invokes, through the bus 705, the application program stored in the memory 706, and executes the following operations:

generating, when a user runs a third-party application program and inputs a phone number through an input/output apparatus 703, a phone call request, and using the phone call request as a trigger condition;

triggering and executing a new initialization subprogram and a corresponding callback function when the new initialization subprogram of a phone application class in a system program detects the phone call request by using a registered global notification;

invoking the phone application class by using an invocation pointer in the callback handler function, and performing a corresponding operation of phone call; and invoking an original initialization subprogram by using an invocation pointer in the new initialization subprogram, so that the system program completes another initialization operation with respect to a phone call function without affecting the original initialization program.

When the terminal device 700 implements the third-party application program, the processor 701 may further perform the following operations:

executing the third-party application program, and generating a trigger condition;

triggering and executing a new initialization subprogram and a corresponding callback handler function when the trigger condition is detected by using a global notification of the new initialization subprogram of an application class in a system program;

triggering and executing the application class by using an invocation pointer in the callback handler function; and triggering and executing an original initialization subprogram of the application class by using an invocation pointer in the new initialization subprogram.

The application class may be a phone application class, the third-party application program is a phone call program, and the trigger condition is a phone call request generated by the phone call program.

A person of ordinary skill in the art may understand that all or some of the steps of the foregoing method embodiments may be implemented by a program instructing relevant hardware. The aforementioned program may be stored in a computer-readable storage medium. During execution of the program, the steps of the foregoing method embodiments are performed; and the aforementioned storage medium includes various media that can store program code, such as a ROM, a RAM, a magnetic disk, or an optical disc.

Finally, it should be noted that the foregoing embodiments are merely used for describing the technical solutions of the present disclosure, but are not intended to limit the present disclosure. Although the present disclosure is described in detail with reference to the foregoing embodiments, a person of ordinary skill in the art should understand that, modifications may still be made to the technical solutions in the foregoing embodiments, or equivalent replacements may be made to part or all of the technical features; and these modifications or replacements will not cause the essence of corresponding technical solutions to depart from the scope of the technical solutions in the embodiments of the present disclosure.

What is claimed is:

1. A method for configuring a basic application function of an intelligent terminal, comprising:

at the intelligent terminal having one or more processors and memory storing program modules to be executed by the one or more processors:

replacing, in a system program, an original initialization subprogram of an application class in the system program with a new initialization subprogram;

configuring a first invocation pointer to the original initialization subprogram in the new initialization subprogram, the first invocation pointer being used for invoking and executing the original initialization subprogram when the new initialization subprogram is executed;

registering a global notification in the new initialization subprogram, the global notification being used for monitoring a trigger condition that is generated by a third-party application program with respect to the application class; and configuring a second invocation pointer to the application class in a callback handler function of the global notification, the second invocation pointer being used for invoking and executing the application class by using the callback handler function when the trigger condition is detected.

2. The method according to claim 1, wherein the step of replacing an original initialization subprogram of an application class in a system program with a new initialization subprogram in the system program further comprises:

using a Hook technology in the system program to replace the first invocation pointer to the original initialization subprogram of the application class in the system program with a third invocation pointer to the new initialization subprogram in a dynamic library.

3. The method according to claim 1, wherein the application class is a phone application class, the third-party application program is a phone call program, and the trigger condition is a phone call request generated by the phone call program.

4. The method according to claim 3, wherein the system program is iOS, and the phone application class is a PhoneApplication class.

5. An intelligent terminal, comprising:

one or more processors;

memory; and a plurality of program modules, when, executed by the one or more processors, cause the intelligent terminal to perform predefined functions, the plurality of program modules further comprising:

an initialization replacement module, configured to replace, in a system program, an original initialization subprogram of an application class in the system program with a new initialization subprogram;

a first pointer configuration module, configured to configure a first invocation pointer to the original initialization subprogram in the new initialization subprogram, the first invocation pointer being used for invoking and executing the original initialization subprogram when the new initialization subprogram is executed;

a notification registration module, configured to register a global notification in the new initialization subprogram, the global notification being used for monitoring a trigger condition that is generated by a third-party application program with respect to the application class; and a second pointer configuration module, configured to configure a second invocation pointer to the application class in a callback handler function of the global notification, the second invocation pointer being used for invoking and executing the application class by using the callback handler function when the trigger condition is detected.

6. The intelligent terminal according to claim 5, wherein the initialization replacement module is further configured to use a Hook technology in the system program to replace the first invocation pointer to the original initialization subprogram of the application class in the system program with a third invocation pointer to the new initialization subprogram in a dynamic library.

7. The intelligent terminal according to claim 5, wherein the application class is a phone application class, the third-party application program is a phone call program, and the trigger condition is a phone call request generated by the phone call program.

8. The intelligent terminal according to claim 7, wherein the system program is iOS, and the phone application class is a PhoneApplication class.

\* \* \* \* \*